Dec. 17, 1946.  M. H. ARVESON  2,412,667

SLUDGE COKING

Filed July 8, 1944

Inventor
Maurice H. Arveson
By Everett A. Johnson
Attorney

Patented Dec. 17, 1946

2,412,667

UNITED STATES PATENT OFFICE 2,412,667

SLUDGE COKING

Maurice H. Arveson, Flossmoor, Ill., assignor to Standard Oil Company, Chicago, Ill., a corporation of Indiana Application July 8, 1944, Serial No. 544,059

9 Claims. (Cl. 23—177)

This invention relates to improved method and means for recovering sulfur values from acid sludge of the type obtained from the sulfuric acid treatment of hydrocarbon oils.

Acid sludges contain relatively large quantities of free sulfuric acid, or sulfuric acid derivatives of hydrocarbons. There are several types of acid sludges available at an ordinary refinery which includes so called carbinol, paraffin, and R & N sludges. The carbinol sludge results from the treatment of white oils with between five and about eight pounds of acid per gallon of oil. The paraffin sludge results from the treatment of lube oils and waxes with one to one and one-half pounds of acid per gallon of oil. The R & N sludge is the most pumpable sludge and is recovered from the light treatment of refined oil and naphtha. Each of these has different disposal characteristics and different proportions of acid and hydrocarbon. The disposal and/or treatment of these types of acid sludges present many problems. Hence, the recovery of the sulfur or acid values of acid sludges and the provision of satisfactory processes for separating and recovering sulfur compounds have been major refinery problems.

Many methods have been suggested for processing acid sludges to effect the recovery of sulfur values as sulfur dioxide followed by the utilization of the sulfur dioxide in the production of sulfuric acid. One prior method has been the treatment of acid sludge with steam and water to produce a light acid oil, acid tars, and weak sulfuric acid. This weak acid, known as sludge acid, ordinarily comprises between about 25 and about 50% titratable sulfuric acid and requires concentration before it can be used economically in refinery processes. In some cases the sludge is destroyed by burning which results in a fume nuisance and the consumption of extraneous fuel since many of the high acid sludges can not support the necessary combustion. Other attempts have been made to decompose the sludge thermally with the production of a gas containing sulfur dioxide and this has been accomplished by directly contacting the acid sludge with a countercurrent flow of hot combustion gases, the combustion gases ordinarily being produced by burning oil or gas in a suitably-designed furnace. In this latter process the sludge is fed to a rotary kiln through which it travels in a settled mass countercurrent to the heating gas. The combustion gases dilute the product gases which are evolved from the acid sludge and thus place a heavy burden on the sulfur dioxide recovery equipment. The system is operated under reduced pressure in an attempt to avoid the fume nuisance.

In another embodiment of the prior art processes, hot solids, such as sand or coke are contacted with acid sludge in a rotary kiln, the heat supplied by the hot solids effecting the decomposition of the acid sludge as the sludge passes in a settled mass through the rotary decomposing zone. The sand carrying a coke deposit is transferred mechanically to a burning chamber wherein all of the coke is burned off thereby heating the sand which is then recycled mechanically to the acid sludge coking kiln. Such a system is inefficient and in general not desirable since the equipment for effecting the coking is in constant need of repair due to the high temperatures and the excessive erosion and corrosion of the mechanical handling apparatus.

Therefore it is an object of my invention to provide a unitary system having a minimum of moving mechanical elements. It is a further object to provide a method and means for effecting the treatment of acid sludges in a unitary system wherein the heat necessary for the recovery of the sulfur dioxide is produced within the system. Another object is to provide a method and means wherein the decomposition of the acid sludge is effected in a continuous and efficient manner. An additional object is to provide a system wherein the coking is effected at a uniform low temperature level. Another object of my invention is to provide a method and means whereby a large variety of acid sludges from a number of different refinery operations may be processed separately or blended without apparatus changes. It is a further object of this invention to provide method and means for the efficient recovery of sulfur dioxide from acid sludges in high concentration. Other objects and advantages of my invention will become apparent as the description thereof proceeds.

Briefly stated, my invention comprises cosuspending acid sludge and a highly-heated turbulent mass of finely divided coke within a vertically elongated coking zone wherein the mass of finely divided coke is maintained in a suspended dense turbulent phase by the upward passage of a gasiform material therethrough. In this system the introduced sludge is quickly decomposed by direct contact with the hot solids maintained in the suspended dense turbulent phase. The weight ratio of hot solids to acid sludge introduced into the coking zone is sufficient to supply the required amount of heat to effect the decomposition of the acid sludge at the optimum coking temperature level. By operating at the lower optimum coking temperature permitted by this turbulent dense phase system, the formation of non-condensibles by cracking of the evolved hydrocarbons is minimized. Typical product distribution in terms of weight per cent of various types of acid sludges subjected to thermal decomposition is as follows:

|  | R and N | Paraffin | Carbonyl |
| --- | --- | --- | --- |
| Coke | 20 | 53 | 39 |
| Hydrocarbon | 5 | 7 | 3 |
| SO₃ | 30 | 20 | 33 |
| Water | 45 | 20 | 25 |

The sulfur values calculated as the available acid ($SO_2 \times 98/64$) are respectively 46, 30, 51 weight per cent.

Gasiform products are separated from the coke particles and sent to sulfur dioxide recovery equipment well known in the art. This frequently comprises an absorber and stripper system. Finely divided sludge coke, including both new and recycled sludge coke, is continuously withdrawn from the coking system preferably in a dense fluidized phase. The removed coke particles may be suspended in a gasiform fluid to effect transfer to the heating zone wherein at least a portion of the transferred coke particles are consumed by contacting with an oxygen-containing gas to produce a highly heated residual portion of coke. Flue gases and finely divided coke are continuously separated. The finely divided hot coke is withdrawn from the heating zone and transferred to the coking zone. This may be done by suspending in a suitable gasiform carrier fluid, such as a portion of the sulfur dioxide containing product stream recovered from the coking zone before or after the scrubber. The net production of coke is withdrawn from either zone.

An essential feature of my invention is maintaining a liquid-like or suspended dense turbulent solids phase within the coking zone and within the heating zone. To attain the desired uniform temperature throughout the mass of suspended coke within a given zone, the volume of the suspended dense turbulent solids phase should be between about 1.2 and about 3.0 times the volume of the settled coke particles, this increase in volume being due to the fact that coke particles are held apart by the vertically-flowing gasiform fluid so that they exhibit substantially free motion in all directions and great turbulence but at the same time settle to such an extent that they remain within the coker or heater as a suspended dense turbulent solids phase. With particles smaller than about 50 mesh, a vertical velocity of gasiform fluid of the order of about 2 to 4 feet per second increases the apparent volume of finely divided coke compared with the volume at rest ranging from between about 1.2 and 3.0, e. g. within the range of between about 1.5 and 2 fold.

In a typical operation the finely divided coke particles average less than about 50 mesh, the bulk of the particles ranging in size from between about 10 and about 100 mesh. Larger particles can be withdrawn as net production of coke. Likewise the larger particles can be ground and suspended in a gasiform fluid. The bulk density of the finely divided coke in a settled condition is usually within the approximate range of 35 to 65 pounds per cubic foot for example about 40 and about 50 pounds per cubic foot. When a gasiform fluid is passed upwardly through a mass of coke particles at a vertical velocity below about .3 foot per second the decrease in bulk density of the coke particles is small. When the vertical velocity of the gasiform fluid is of the order of 5 to 10 feet or more per second, the coke particles are swept upwardly as a dispersed phase in the gasiform fluid. Between about .3 and 5 feet and more particularly between the limits of between about 1.5 and 3 feet, for example, about 2 feet per second, the bulk density of the coke particles is materially decreased and takes on the appearance of a boiling liquid, i. e., the coke particles are suspended as a dense turbulent solids phase which is liquid-like but which remains substantially in place instead of being carried upwardly with the ascending gas stream.

Figure 1:
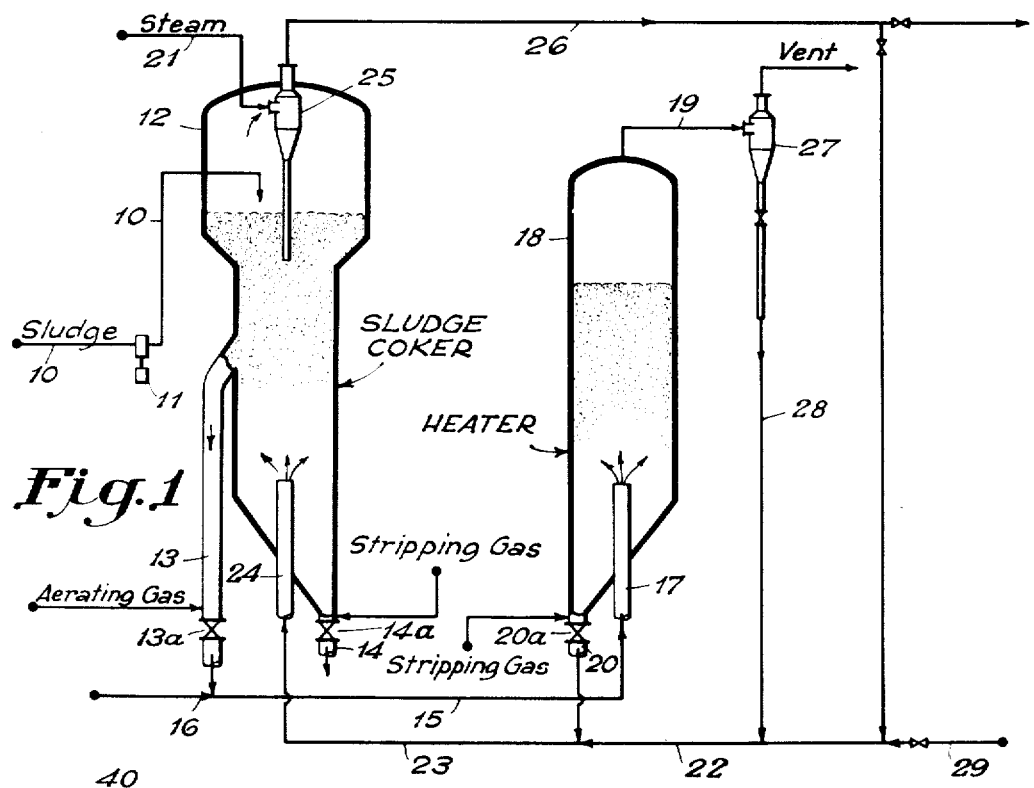
Fig. 1 is a diagrammatic illustration of a preferred form of the apparatus.

With particular reference to Figure 1 of the drawing wherein the form of apparatus is diagrammatically illustrated, the acid sludge to be coked is fed by line 10 and pump 11 into the recovery chamber or sludge coker 12. The coker or recovery chamber 12 should be of such size and shape as to permit maintaining therein a major amount of finely divided hot coke in a suspended dense turbulent phase, gasiform fluid and hot coke being supplied to coker 12 via conduit 24. Upward gas velocity of the order of one to two feet per second, for example, can be used to maintain the suspended dense turbulent phase within the coking zone. Finely divided coke is withdrawn downwardly from the coker 12 through conduit 13. A valve 13a can be used to control the flow of the finely divided sludge coke into the transfer line 15. The net production of coke can be removed by conduit 14 and valve 14a. The coke withdrawn at this point will be of the largest particle size in the system and can be ground or milled before returning it to the system. An oxygen-containing gas is supplied by line 16 and transferred via lines 15 and 17 to heater 18. The proportion of oxygen in the carrier gas may be controlled independently of the volume and velocity of gasiform material introduced into 18 by supplying steam, flue gas, or the like as a diluent for the oxygen-containing gas such as air. The desired temperature level and the suspended dense turbulent phase within the heater zone 18 is obtained by this means. The bulk of the hot residual coke is continuously separated from the flue gases within the upper part of chamber 18, the gases being removed overhead by conduit 19.

Temperatures ranging from as low as burning will take place to as high as between about 1800 and 2500° F. are readily attainable by oxidizing the finely divided sludge coke within the heater 18 and the temperature can be controlled by the amount of oxygen made available to the heater as described above. In the embodiment described herein the temperature of the hot solids and the recycle rate of the hot solids between the heater 18 and the decomposing or recovery zone 12 are controlled to maintain a temperature between about 800 and 1500° F., for example, below about 1200° F. in the heater 18.

The hot finely divided coke is withdrawn from chamber 18 by standpipe 20 which may be provided with a suitable valve 20a for controlling the suspension of the coke in the gasiform fluid in transfer line 23. The rate of addition is regulated to control the temperature of the coking zone at the desired level. A suitable gasiform fluid in line 23 is a portion of the sulfur dioxide containing gases recovered from the chamber 12. Extraneous gasiform fluid can be supplied via line 29. The hot coke and combustion gases are continuously separated in chamber 18 and the gases removed overhead via line 19 to cyclone separator 27. Residual coke is withdrawn by line 28 and this finely divided material is preferably sent to the sludge coker via lines 22, 23, and 24. The suspension of the hot coke particles is transferred via lines 23 and 24 into the chamber 12 wherein the coke is maintained in a suspended dense turbulent phase.

The acid sludge is introduced preferably as a spray into the chamber 12 by the element 10 which diagrammatically illustrates a suitable distributor means. The acid sludge is brought into intimate contact with the highly heated turbulent mass of hot coke particles within the chamber 12 and a rapid decomposition to produce gaseous sulfur dioxide, water, hydrocarbons, and coke takes place. The gasiform products are continuously separated from the finely divided coke particles in the upper part of chamber 12. Residual coke particles are removed by cyclone separator 25 and the substantially coke-free gas is sent by line 26 to sulfur dioxide recovery means. If desired superheated steam can be introduced by line 21 into the cyclone 25 to avoid coking therein. The heat for superheating the steam can be obtained from the heater system if desired. The gasiform coking products in line 26 comprise essentially sulfur dioxide, both recently-recovered sulfur dioxide and recycle sulfur dioxide where that material is used to maintain the dense turbulent suspended phase within the chamber 12. Aerating and/or stripping gas such as steam can be introduced at a low point in the transfer conduits 13, 14, or 20.

The acid sludge normally may be introduced into the system at a temperature of about 120° F. and care must be exercised to avoid coking of the acid sludge within the distributor. Cooling means can be provided for protecting the distributor. Pump, conduit means, and back pressure valve or relief valve means can be provided for assuring the continued circulation of sludge through the distributor in the event of plugging of the orifices. It is known that the acid content of sludge affects the coking temperature and it may be desirable in some instances to dilute the acid sludge with sulfuric acid similar to sludge acid to effect the introduction of the sludge. Uniform temperature conditions are readily maintained within the coking zone, and the temperature level can be varied with the different type of sludges being processed, but it is an advantage of the herein-described system that it can be adapted for optimum coking of practically any type of sludge available without any modification in the apparatus by the simple expedient of increasing or decreasing the rate of addition or the temperature level of the hot coke introduced into the coking zone.

The optimum coking temperature within zone 12 ordinarily will be at a temperature between about 400° F. and 1000° F. preferably about 450 to 750° F., for example 500° F. Coking in the dense turbulent phase permits decomposition at uniformly low temperature thus minimizing the production of non-condensible hydrocarbons in the sulfur dioxide bearing product stream and still maintaining effective sulfur recovery.

By my process the coke produced in the recovery of the sulfur values of acid sludges is more than enough to produce the necessary heat for the coking of the sludge about one-fourth of the coke being consumed. Net production of coke depends upon the hydrocarbon content of the acid sludge and the recycle rate of coke retained within the system depends on the coking temperature desired, which again is dependent upon the type of sludge being treated. In general the coke to sludge weight ratio is between about 2 and 5, for example 3 or 4 to 1. The very large surface presented by the finely divided coke particles while suspended in a dense turbulent solids phase, permits the acid sludge to be coked at an extraordinarily high rate so that smaller coking units can be used for a given capacity of acid sludge disposal. My process is unique in that it has extreme flexibility in type of sludge that is treated in a given piece of equipment and is readily controlled for the optimum production of sulfur dioxide with any type of fluid acid sludge. This is of considerable importance in the ordinary refinery where a number of different sludges is available. Likewise the high concentration of sulfur dioxide in the product gases makes for easy and economical recovery.

Another factor which contributes to the exceptional utility of my process is the utilization of the sulfur dioxide-containing gasiform product as a carrier gas for the finely divided coke being transferred from the burning zone to the coking zone. The expedient provides the necessary gasiform fluid for maintaining the suspended dense turbulent phase without increasing the load on the sulfur dioxide recovery apparatus.

In each of the contacting zones I maintain a suspended dense turbulent solids phase. With slight aeration, i. e., with gasiform fluid velocities of between about 0.05 and about 0.3 feet per second the bulk density of dense phase solids produced by my process will usually be in the order of magnitude of more than about 90% of the density of the finely divided material when measured in a settled condition. With upward vapor velocities of between about one and three feet per second, the particles are maintained in a suspended dense turbulent phase and the bulk density of such phase will ordinarily be between about 30 and about 90% usually between about 40 and 70% of the apparent density of the settled material. With higher gas velocities, e. g. the velocities existing within transfer lines, the particles are in a dilute dispersed phase. The light dispersed phase in the upper part of the heating and coking zones is usually substantially less than 10% of the bulk density of the suspended dense turbulent phase maintained within the lower part of the two zones.

Figure 2:
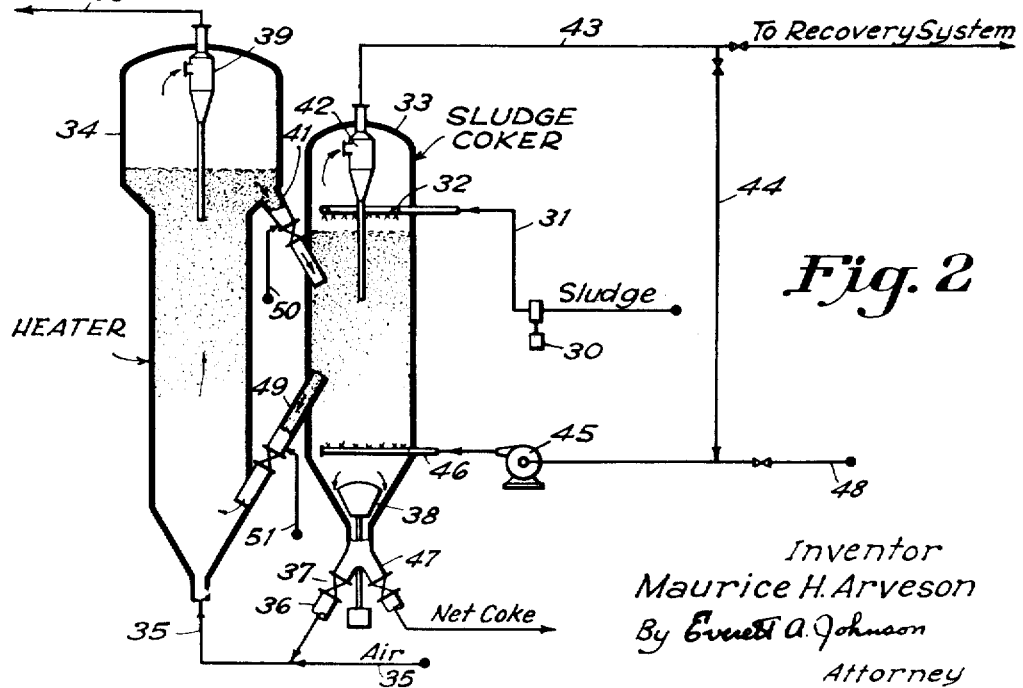
Fig. 2 is a diagrammatic illustration of a modified form of the apparatus.

In Figure 2 another embodiment of my invention is illustrated wherein there is dense phase transfer of the coke particles between the heater and coker, i. e. the transfer of the solids is made in substantially the same phase as exists in the respective contacting zones. More specifically, the sludge is introduced via pump 30, line 31 and distributor 32 into the coker chamber 33. The distributor 32 may be jacketed with a suitable cooling fluid so as to avoid coking of the sludge within the distributor prior to introduction into the chamber 33. Circulation thru a loop system previously mentioned will also reduce coking tendency. In general the gasiform fluid velocities, solids densities, and temperatures within coker 33 and heater 34 correspond to those described in connection with Figure 1.

The gasiform fluid containing oxygen, which may for example be air, is supplied by line 35 and finely divided coke particles are introduced therein by line 36 containing valve 37. A grinding element 38 can be provided at the base of coker 33 to assure the proper coke particle size. It is also contemplated that the coke grinding can be effected in a separate mill, only that portion being ground which is sent to the heater. The suspension of coke and air passes through line 35 into a lower portion of the heater 34 wherein at least a portion of the coke is consumed to produce a residual hot finely divided coke. The hot coke and combustion gases are continuously separated within the enlarged upper portion of the heater 34 and residual amounts of coke are removed from the combustion gases by means of a cyclone separator 39. The coke-free flue gases are removed overhead by line 40. The hot coke is transferred in the suspended dense turbulent phase by downcomer 41 into the suspended dense turbulent phase maintained within the coker 33. A suitable aerating and/or stripping gas can be introduced by line 50.

The gasiform products comprising substantial amounts of sulfur dioxide are separated from the sludge coke within the upper portion of the coker 33 and any residual coke particles are removed from the gasiform products by means of a cyclone separator 42. Superheated steam can be introduced into the separator 42 to combat any tendency to plug. The sulfur dioxide stream is removed overhead by line 43 and a major portion is sent to a recovery system not shown. Another portion of the gasiform products is diverted by valved line 44 and introduced by blower 45 and distributor line 46 at a low point into the coker 33. This recycled gasiform fluid is utilized for maintaining the suspended dense turbulent phase of the hot coke within the coker chamber 33 since it reduces the load on the sulfur dioxide recovery system but other gasiform materials can be used. The net production of coke can be withdrawn via line 47 or a line by passing the grinder diagrammatically represented at 38. If desired, all or a portion of the suspended dense turbulent finely divided coke particles which are supplied to the heater 34 can be transferred from one dense phase to the other by means of optional line 49. Aerating and/or stripping gas can be introduced via line 51. When this latter means of transfer is used, the level of suspended dense turbulent particles ordinarily will be higher in the coker zone 33 than that maintained within the heater zone 34. When 49 is used, the coke to sludge ratio charged to the coking zone 33 may be controlled by both the valve setting in line 49 and independent regulation of the total quantities of gasiform fluids.

In describing my invention I have made reference to solids having certain particle sizes. It should be understood that coke having a particle size for example 0.06 to 0.25 inch in diameter also can be processed but in that event higher vertical velocities of the gasiform fluids will be used. Likewise it is contemplated that a mixture of varied sized particles will be processed. Grinding of the coke is unnecessary in some cases since in general the produced coke particles will be smaller than the orifices of the sludge distributors. The particle size will also be reduced in the burning or heating step. Thus settled coke from the coker can be introduced into the heater and partially consumed to the extent that the particle size is appreciably reduced.

From the above embodiments it will be apparent that I have described method and means for attaining the objects of my invention and have provided a novel method and apparatus for the recovery of sulfur values from acid sludges in a new and more efficient manner. Modifications of the illustrated system are contemplated without departing from the spirit of the invention. Cyclone separators can be used or not and can be mounted inside or outside the contacting zones. Temperature measurement and control means can be supplied to effect the desired process steps and other engineering details can be supplied.

Although I have described my invention with reference to a particular embodiment thereof, it should be understood that the accompanying description is for the purpose of illustration only and that the scope of the invention is defined by the appended claims.

I claim:

1. The method of recovering sulfur values from acid sludge produced by the treatment of petroleum hydrocarbons with sulfuric acid, the steps which comprise introducing acid sludge and hot finely divided sludge coke into a coking zone, passing a gasiform fluid upwardly through said sludge coke at a rate sufficient to maintain a dense turbulent coke phase within the coking zone, maintaining a weight ratio of hot finely divided coke to acid sludge introduced into said coking zone sufficient to supply the amount of heat necessary to effect decomposition of the acid sludge thereby producing additional amounts of finely divided sludge coke and gasiform products, withdrawing gasiform products from the coking zone, withdrawing sludge coke from the coking zone, transferring at least a portion of the withdrawn sludge coke to a heating zone, passing an oxygen-containing gasiform fluid upwardly through said heating zone at a rate sufficient to maintain the coke in the heating zone in a dense turbulent suspended phase, raising the temperature of the finely divided coke transferred to the heating zone by oxidizing a portion of the coke therein, and supplying at least a major proportion of the hot finely divided coke to the coking zone.

2. The method of recovering sulfur values from acid sludge produced by the treatment of petroleum hydrocarbons with sulfuric acid, the steps which comprise introducing acid sludge and hot finely divided sludge coke into a coking zone, passing a gasiform fluid vertically through said sludge coke at a rate sufficient to maintain a dense turbulent suspended phase within the coking zone intimately contacting the acid sludge and hot coke in the dense turbulent suspended phase whereby a uniform temperature for producing additional amounts of finely divided sludge coke and gasiform products is maintained, withdrawing gasiform products and sludge coke separately from the coking zone, transferring at least a portion of the withdrawn sludge coke to a heating zone, passing a reactive gasiform fluid upwardly through said heating zone at a rate sufficient to maintain the finely divided coke in a fluidized dense phase raising the temperature of the finely divided coke supplied to the heating zone by exothermically reacting said gasiform fluid with a portion of said coke, and supplying at least a major proportion of the hot finely divided coke to the coking zone in a weight ratio of hot coke to sludge sufficient to supply the amount of heat necessary to maintain the coking zone at the desired level.

3. A method for recovering sulfur values from acid sludge which comprises the steps of maintaining a quantity of finely divided sludge coke within a confined contacting zone at coking temperature, introducing a stream of substantially inert gasiform fluid into said zone at a low level, passing gasiform fluid upwardly within said zone at a rate sufficiently low to maintain said coke in a suspended dense turbulent condition, introducing acid sludge into said zone at a high point therein, intimately contacting the introduced sludge with the hot finely divided coke maintained within the coking zone, removing gasiform fluids from an upper part of said zone and recovering at least one sulfur-containing material from said fluid, continuously withdrawing a portion of the coke from said contacting zone, introducing at least a portion of the solids thus removed into a separate combustion zone, maintaining a quantity of finely divided sludge coke within said combustion zone, introducing an oxidizing gas at a low level into said combustion zone, passing said oxidizing gas upwardly through said combustion zone at a rate sufficiently low to maintain the solids therein in a suspended dense turbulent condition, burning a portion of said coke within said combustion zone whereby the residual portion of said coke is highly heated and raised to a temperature substantially higher than the temperature within the coking zone, removing highly-heated coke from said combustion zone, dispersing at least a portion of the removed highly-heated coke in said inert gasiform fluid, and transferring the dispersed coke in said stream to said confined contacting zone for supplying heat thereto.

4. The method of coking acid sludge recovered from the sulfuric acid treatment of hydrocarbons which comprises the steps of maintaining a quantity of finely divided coke within a confined contacting zone, said coke having been produced as defined hereinbelow, introducing a substantially inert gasiform fluid into said zone at a low point, said fluid being introduced at a rate sufficient to maintain said coke in a suspended dense turbulent condition, supplying acid sludge to said coking zone and commingling the acid sludge and finely divided coke whereby the acid sludge is decomposed to produce additional quantities of coke and gasiform products, removing gasiform fluid from said zone, continuously removing a portion of the coke from said zone, introducing at least a portion of the coke thus removed into a separate combustion zone, maintaining a quantity of finely divided coke within said combustion zone, introducing an oxidizing gas at a low point of said combustion zone and passing said gas upwardly through the said solids at a rate sufficient to maintain the said coke in a suspended dense turbulent condition, consuming at least a portion of said coke by burning within said combustion zone thereby producing a quantity of hot finely divided coke, removing a portion of the highly heated coke from said combustion zone and transferring the removed highly heated coke to said coking zone.

5. The process of claim 4 wherein the coke removed from the coking zone is transferred to the combustion zone by means of the oxidizing gas being supplied to said combustion zone.

6. The process for recovering sulfur dioxide from acid sludge resulting from the sulfuric acid treatment of petroleum hydrocarbons which comprises the steps of supplying the acid sludge to a coking zone wherein a substantial body of preformed sludge coke is maintained in a dense suspended turbulent phase at a coking temperature, supplying a sulfur dioxide-containing gasiform fluid to said coking zone at a low point therein and at a rate sufficient to maintain said finely divided coke in the said suspended dense turbulent phase, removing gasiform fluids from said zone, withdrawing finely divided sludge coke from said coking zone and transferring at least a portion to a separate combustion zone, maintaining within said combustion zone a body of finely divided coke in a suspended dense turbulent phase, supplying an oxidizing gas to said combustion zone and passing said gases upwardly through said zone at a rate sufficient to maintain the said suspended dense turbulent phase, consuming a portion of the finely divided coke while maintained in the suspended dense turbulent phase by oxidation thereof whereby the residual proportion of finely divided coke is increased in temperature substantially above that maintained within the coking zone, separating combustion gases and hot finely divided coke and transferring the separated hot finely divided coke to said coking chamber for supplying the heat necessary for coking said acid sludge.

7. The method of recovering carbon and sulfur values from acid sludge produced by the treatment of petroleum hydrocarbon with sulfuric acid the steps which comprise maintaining a quantity of hot finely divided coke within a coking zone, passing a gasiform fluid upwardly through said zone at a rate sufficient to maintain the coke in a dense turbulent suspended phase, continually supplying hot finely divided coke to said zone, introducing acid sludge into said zone, intimately contacting the acid sludge and hot coke in the dense turbulent suspended phase to produce sludge coke and sulfur-containing gasiform products, withdrawing gasiform products from the coking zone, accumulating coke in a low part of said zone, grinding the accumulated coke to produce finely divided coke, and continually transferring at least a portion of the finely divided coke from said coking zone.

8. The method of recovering carbon and sulfur values by coking sulfur-containing carbonaceous material, the steps which comprise maintaining a quantity of hot finely divided coke within a coking zone, passing a gasiform fluid upwardly through said zone at a rate sufficiently high to maintain a dense turbulent suspended coke phase superimposed by a dispersed coke phase, introducing hot finely divided coke into said dense turbulent suspended coke phase, introducing the carbonaceous fluid into said coking zone above the said turbulent suspended dense phase, intimately contacting the carbonaceous fluid and hot coke particles in the dense turbulent suspended phase to produce additional coke and sulfur-containing gasiform products, withdrawing gasiform products from the coking zone, and withdrawing at least two streams of finely divided coke from the coking zone.

9. The method of recovering carbon and sulfur values from sulfur-containing carbonaceous materials which comprises the steps of maintaining a first quantity of hot finely divided coke within a coking zone, maintaining a second quantity of finely divided coke within a heating zone, passing a gasiform fluid upwardly through said coking zone at a rate sufficient to maintain a dense turbulent suspended coke phase therein, passing an oxygen-containing gasiform fluid upwardly through said heating zone at a rate sufficient to maintain a dense turbulent suspended coke phase, spraying the carbonaceous material into said coking zone above said dense turbulent suspended coke phase, transferring downwardly fluidized coke from a high point in said coking zone at an intermediate point in said heating zone, downwardly transferring hot fluidized solids from an intermediate point in said heating zone to a low point in said coking zone, withdrawing gasiform fluids at a high point from said coking zone and from said heating zone, withdrawing another stream of finely divided coke from the coking zone, suspending at least a portion of withdrawn coke in the oxygen-containing gasiform fluid, and introducing the said suspension into said heating zone.

MAURICE H. ARVESON.

Disclaimer 2,412,667.—*Maurice H. Arveson*, Flossmoor, Ill. SLUDGE COKING. Patent dated Dec. 17, 1946. Disclaimer filed Apr. 14, 1948, by the assignee, *Standard Oil Company (Indiana)*.

Hereby enters this disclaimer to claims 4 and 5 in said patent.

[*Official Gazette, May 18, 1948.*]

oxygen-containing gasiform fluid upwardly through said heating zone at a rate sufficient to maintain a dense turbulent suspended coke phase, spraying the carbonaceous material into said coking zone above said dense turbulent suspended coke phase, transferring downwardly fluidized coke from a high point in said coking zone at an intermediate point in said heating zone, downwardly transferring hot fluidized solids from an intermediate point in said heating zone to a low point in said coking zone, withdrawing gasiform fluids at a high point from said coking zone and from said heating zone, withdrawing another stream of finely divided coke from the coking zone, suspending at least a portion of withdrawn coke in the oxygen-containing gasiform fluid, and introducing the said suspension into said heating zone.

MAURICE H. ARVESON.

Disclaimer 2,412,667.—*Maurice H. Arveson*, Flossmoor, Ill. SLUDGE COKING. Patent dated Dec. 17, 1946. Disclaimer filed Apr. 14, 1948, by the assignee, *Standard Oil Company (Indiana)*.

Hereby enters this disclaimer to claims 4 and 5 in said patent.

[*Official Gazette, May 18, 1948.*]